United States Patent [19]

Flesher et al.

[11] Patent Number: 5,283,272
[45] Date of Patent: Feb. 1, 1994

[54] PROCESS AND APPARATUS FOR PERFORMING CHEMICAL REACTIONS

[75] Inventors: Peter Flesher; David Farrar, both of West Yorkshire, England

[73] Assignee: Allied Colloids Limited, England

[21] Appl. No.: 924,361

[22] Filed: Jul. 31, 1992

Related U.S. Application Data

[63] Continuation of Ser. No. 733,960, Jul. 22, 1991, abandoned, which is a continuation of Ser. No. 543,969, Jun. 26, 1990, abandoned.

[30] Foreign Application Priority Data

Jun. 26, 1989 [GB] United Kingdom ............... 8914600

[51] Int. Cl.$^5$ .............. C08L 33/02; C08L 33/18; C08L 33/26
[52] U.S. Cl. ................. 523/313; 523/318; 524/555; 524/556; 524/565
[58] Field of Search ............ 523/313, 318; 524/555, 524/556, 566, 565

[56] References Cited

U.S. PATENT DOCUMENTS

| | | | |
|---|---|---|---|
| 3,968,093 | 7/1976 | Hasegawa et al. | 524/827 |
| 4,049,606 | 9/1977 | Hunter et al. | 524/502 |
| 4,341,681 | 7/1982 | Sekmakas et al. | 524/555 |
| 4,464,509 | 8/1984 | Schroeder, Jr. | 523/318 |
| 4,576,978 | 3/1986 | Luetzelschwab | 523/313 |
| 4,789,695 | 12/1988 | Farrar et al. | 523/336 |

FOREIGN PATENT DOCUMENTS 1443453 7/1976 United Kingdom .

OTHER PUBLICATIONS

Perry et al., Editors, "Perry's Chemical Engineers' Handbook", McGraw-Hill Book Co., 6th Ed., 1990, pp. 4-24 to 4-36.

Primary Examiner—Joseph L. Schofer
Assistant Examiner—R. H. Delmendo
Attorney, Agent, or Firm—Ostrolenk, Faber, Gerb & Soffen

[57] ABSTRACT

High molecular weight polymer that can form a viscous aqueous solution is chemically modified by mixing the previously formed polymer (as a powder, reverse phase dispersion or oil-in-water emulsion) with water and the reagent for effecting the chemical modification so as to form a viscous aqueous mixture having a viscosity of at least 1000 cps (Brookfield RVT) and then feeding this mixture as intermittent batches into one end of a tower through which it moves with substantially plug flow and from which it is withdrawn, at the end of the reaction, as intermittent batches. The apparatus for this purpose is also novel.

11 Claims, 1 Drawing Sheet

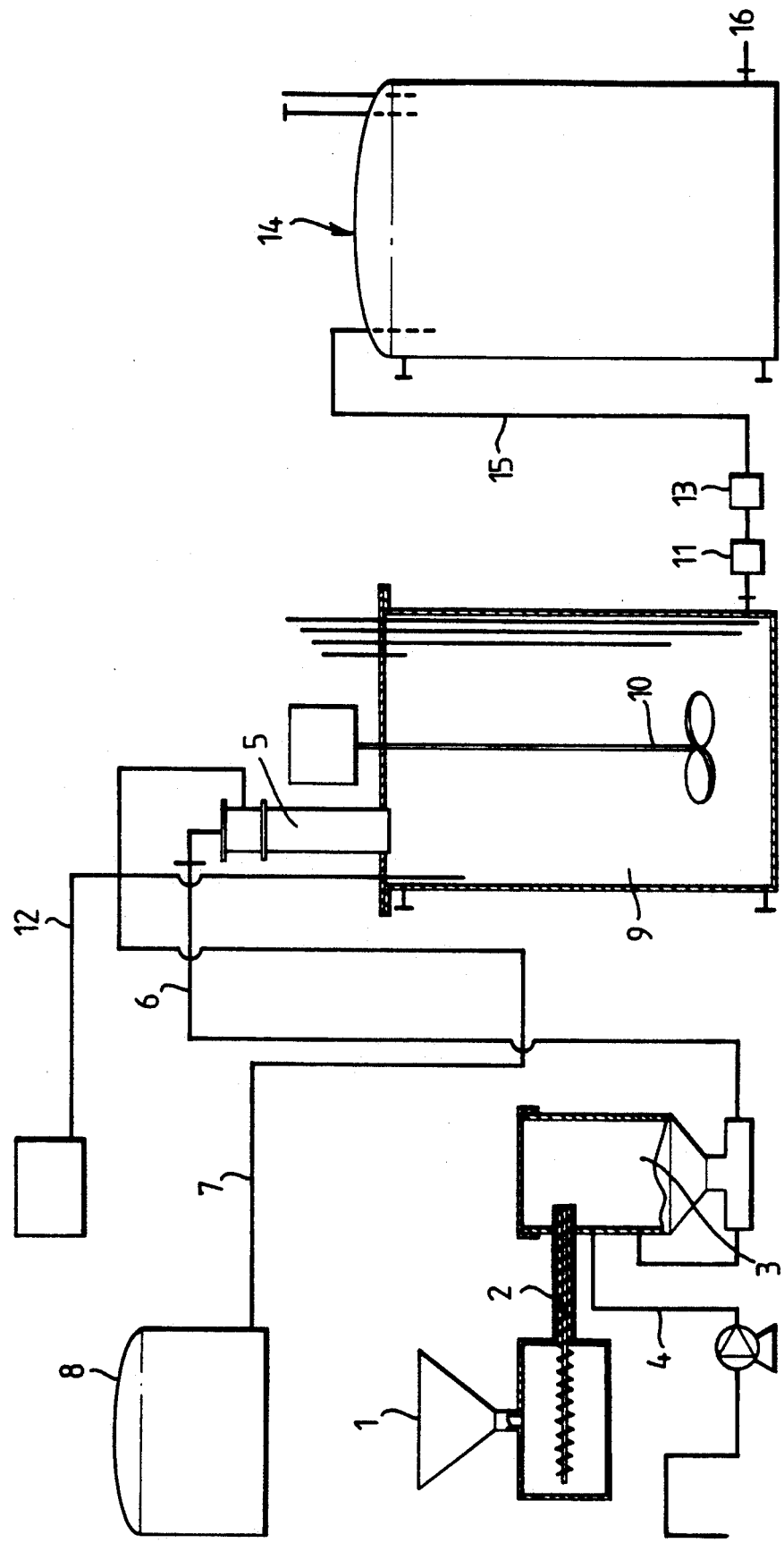

PROCESS AND APPARATUS FOR PERFORMING CHEMICAL REACTIONS

This is a continuation of application Ser. No. 07/733,960, filed on Jul. 22, 1991, now abandoned, which was a continuation of application Ser. No. 07/543,969, filed on Jun. 26, 1990, now abandoned.

The present invention relates to the chemical modification of high molecular weight water soluble or potentially water soluble polymers, that is to say polymers that give viscous solutions when relatively small amounts of the polymer are mixed into an aqueous medium.

Numerous chemical modifications of this general type are well known, a typical example being the hydrolysis of substantially non-ionic polyacrylamide to form anionic polyacrylamide (i.e., a copolymer of acrylamide and acrylic acid, generally as the sodium salt).

The production of good quality, high molecular weight, water soluble polymers requires very careful control of the polymerisation process, and if the process is not optimised then the polymer is liable to be contaminated with lower molecular weight material and/or to be inferior in various other ways. Accordingly, much skill has been devoted to optimising processes for making high molecular weight polymers by, generally, bulk gel polymerisation or reverse phase or emulsion polymerisation. In some instances, the polymer manufacturer will also perform the chemical modification of the polymer at the same plant as the polymer is initially made, but often it is desirable to perform the modification elsewhere, for instance at or near the place where the final polymer is to be used.

A typical on-site process for modifying such polymers comprises forming an aqueous solution containing the polymer, water and the reagent that is to effect the modification (e.g., caustic soda) by mixing the ingredients in a mixing vessel at a temperature at which the reaction will occur. The mixture is left in the vessel, with stirring when appropriate, for the desired duration of the reaction (typically 24 hours) and the resultant reaction mixture is then emptied from the vessel.

This method is inconvenient and inefficient. It is a batch process and while the mixing vessel is being used for one batch reaction it cannot be used for mixing or reacting another batch. The solution is viscous, even at very low polymer concentrations, and to cope with this viscosity the vessel is normally equipped with powerful supply feeds and mixers, but these may only be required for a very short proportion of the overall process. The vessel may need to be provided with heaters, increasing capital cost still further. The low efficency may lead to a need for more forceful conditions to be used in order to increase the rate of reaction. However, in cases where the particular reaction achieves an equilibrium position, more violent conditions may have the effect of lowering the yield of required product.

The need for powerful supply feeds and mixers (that are idle for much of the time) is reduced if the reaction mixture is made more dilute (and thus less viscous) but this increases the capacity of the reaction vessel that is required to convert a given amount of polymer.

It is often desirable to form the chemically modified polymer either continuously or in frequently occurring batches, i.e., every two or three hours at the most, so as to minimise the storage that is required if a continuous supply of modified polymer is to be provided to, for instance, a well head. Because the described reaction is a batch process that involves both the mixing stage and the reacting stage, and which is therefore usually very slow, the only way of producing frequent batches is by having a large number of the mixing vessels being used in sequence, each vessel being equipped with its own powerful supply feeds and mixers.

U.S. Pat. No. 4,576,978 describes a process in which the polymer is made from monomer and is immediately chemically modified. The process comprises feeding a conventional aqueous monomer solution (which is therefore typically as thin as water) as batches into the top of a reaction tower, allowing polymerisation to proceed in the tower and removing the resultant viscous polymer solution as batches from the bottom of the tower. Thus the water thin monomer is fed into the tower above a layer of viscous polymer, and the reacting mixture gradually moves down through the tower. It is stated that when polymerisation has gone substantially to completion the mixture is withdrawn from the tower. Some intermixing between the batches is bound to occur and so the careful control, that is necessary for the production of optimum high molecular weight polymers, cannot be guaranteed. This process therefore will inevitably lead to the production of a polymer of lower quality than is obtainable by conventional manufacturing methods such as bulk gel or reverse phase polymerisation.

The aqueous polymer that is produced in this tower is viscous and has to be mixed with caustic soda or other hydrolysing reagent, prior to the chemical modification. In order to permit the mixing in-line, the viscous solution has to be diluted with water. The resultant relatively dilute solution is then continuously fed into the top of another reactor in a manner which is said to minimise its penetration into the fluid already in the reactor, and is finally withdrawn from the bottom of the reactor. The extent of hydrolysis throughout the reactor is said to vary continuously as a function of the reactor location.

Although this process may be suitable if the polymer is of relatively low molecular weight (so that its solution viscosity is not too high) the process is unsatisfactory if the polymer has a very high solution viscosity. This is because it would then be necessary to dilute the polymer with a large amount of water in order to permit convenient admixture with the hydrolysing reagent and so the final reactor vessel would have to be very large.

Accordingly this specification does not give an answer to the problem of providing a convenient, and more efficient, way of chemically modifying a polymer that has previously been made as a powder or reverse phase dispersion or as oil-in-water emulsion and which has optimum, high, solution viscosity and molecular weight.

In the invention, a polymer that can form a viscous aqueous solution is chemically modified by reaction with a reagent and the process comprises forming an aqueous mixture of the reagent and the polymer, introducing the aqueous mixture into one end of the reaction tower, holding the mixture in the tower while the reaction proceeds, and removing the mixture containing the chemically modified polymer from the other end of the tower. In particular, the polymer is provided initially in the form of a powder or reverse phase dispersion or oil-in-water emulsion and the aqueous mixture is made by combining water, the polymer and the reagent and has a viscosity of at least 1,000 cps at the point of introduction into the tower, the mixture is introduced as intermittent batches into the tower, the mixture moves through the tower with intermittent substantially plug flow, and the mixture is removed from the tower as intermittent batches.

The invention also includes novel apparatus suitable for use in this process. Such apparatus comprises means for mixing polymer powder or reverse phase dispersion or oil-in-water emulsion with water and reagent to form a viscous aqueous mixture, a reaction tower having an inlet at one end and an outlet at the other end, and automated means for pumping intermittent batches of the aqueous mixture into the inlet and automated means for withdrawing intermittent batches of aqueous mixture from the outlet.

The sole FIGURE shows schematically an apparatus for carrying out the invention.

The polymer must be (or must become during the process) sufficiently water soluble that, when mixed with the other components of the aqueous mixture it forms a viscous aqueous solution. The polymer can be truly water soluble or, if it is present as an emulsion or dispersion having particle size below about 10 $\mu$m it can be lightly cross linked, in known manner.

The polymer must have sufficiently high molecular weight that it gives a high solution viscosity. In particular, the viscous mixture must have sufficient viscosity to permit plug flow and minimise mixing of adjacent batches. Thus, the viscosity is typically at least about 1000 cps, preferably at least about 5000 cps, most preferably at least about 8000 cps or may be about 10,000 cps or more measured by a Brookfield RVT viscometer at the temperature prevailing in the tower, using a spindle and spindle speed (usually 10 rpm) appropriate for that particular solution. It is generally undesirable for the viscosity to be too high and so it is normally below 50,000 and preferably below 20,000 cps.

The polymer is provided for the process as a powder or as a reverse phase dispersion or as an oil-in-water emulsion, and this has to be blended with water and the reagent. Because of the difficulty of introducing reagent into a solution after it has achieved its maximum viscosity, the aqueous mixture is preferably made by dissolving the powder or emulsion or dispersion into water containing the reagent while the water has low viscosity (e.g., below 500 cps and often below 200 cps). Thus the reagent should either be in the water before adding the polymer or before maximum viscosity is achieved, e.g., within a few seconds of adding an emulsion or dispersion or at least an hour before completing the mixing of solid polymer, in order to facilitate thorough mixing. It is often preferred to include the reagent in the water before adding any of the powder or dispersion or emulsion to the water but, alternatively, reagent can be added to the aqueous mixture after the powder or dispersion or emulsion has been added provided the viscosity is still relatively low.

Typically, the overall mixing process takes one to five hours, often around two hours, to achieve full dissolution (i.e., substantially maximum viscosity) and the mixture may be stirred continuously or intermittently throughout this process, in known manner.

The means for dissolving the polymer into with water can be conventional polymer-dissolution means. For instance, if the polymer is supplied as a reverse phase dispersion of polymer particles usually less than 10 $\mu$m, and preferably less than 3 $\mu$m, in a water immiscible liquid, this dispersion is inverted into the dilution water, often in the presence of an oil-in-water activating surfactant. Formation of the solution can be promoted by use of an orifice mixer, e.g., as described in U.S. Pat. No. 4,537,513. If the polymer is supplied as an oil-in-water emulsion it may merely be mixed into water.

Generally however the polymer is provided as a powder and this can be dissolved using conventional powder-mixing apparatus. Such powders tend to be difficult to mix and dissolve into water because on contact with water they tend to form sticky aggregates of polymeric material. Known ways of minimising this problem can be used, e.g., by carrying out the process of the present invention in conjunction with a spray mixing apparatus according to GB 1501938. In this, particulate polymer is entrained into a stream of gas before mixing with a plurality of fine water sprays to allow wetting by achieving contact between the solid particles and particles of liquid in the form of a mist. The prewetted particles can then be mixed into the bulk dilution water.

The aqueous mixture preferably has the desired reaction temperature before it is introduced into the tower. For instance it, or the water used for its production, can be preheated. The reaction mixture is preferably maintained substantially at the desired reaction temperature during its passage through the tower and preferably this is achieved substantially without heating of the tower. Thus it is preferred that there should not be any internal heating coils or other heaters to raise the temperature although slight external heating can be applied, for instance in the form of a heating jacket, to prevent cooling if the ambient atmospheric temperature is unacceptably low. Generally, however, it is sufficient for the reaction tower to be thermally insulated to minimise heat loss. For a reaction which requires constant temperatures, the change in temperature of the mixture varies preferably not more than ±5% throughout the residence time in the reaction tower.

The residence time of each batch in the reaction tower can be selected according to the particular reaction by selecting the size of the batches and the frequency of batches for a particular reaction tower. The batches may be of varying sizes, but preferably the batches are substantially the same size.

The residence time i.e. the time taken for the reaction to proceed to a satisfactory product yield, is preferably from 1 to 48 hours and most preferably from 2 to 24 hours. The number of batches held in the tower is preferably from 2 to 20, and most preferably from 3 to 10. The tower may be full or may have some head space and consists essentially of a simple empty tank preferably being thermally insulated. Between each plug flow movement there is preferably a stationary period of at least 0.2 hours, more preferably at least 0.5 hours and most preferably at least one hour. Generally the quiescent time between each plug flow movement (i.e., between each batch) is at least twice the duration of a plug flow movement, typically at least four times and often at least six times.

If the solution entering the tower is very viscous then a single supply point will be adequate to produce sufficiently low mixing with the previous batch. However, sometimes (especially for less viscous solutions) a distributor manifold is more beneficial as this enables the mixture to enter the reaction tower across its surface area, thus reducing the risk of mixing with the previous batch.

The supply of the aqueous solution to the tower generally requires pumping of the solution to the tower for the duration during which the solution is to flow into the tower. The operation of the pump, and any necessary valves to control flow, can be controlled manually but is preferably controlled automatically. The means for automatic control may be responsive to some change in physical properties of the solution within the tower, for instance indicating the desired degree of chemical modification, but usually are on an automatic timing sequence that is selected having regard to the materials being treated and other relevant circumstances.

Withdrawal of a batch of the product from the reaction tower can be forced by the supply of a batch to the tower. For example, there can be upflow so that introduction of a new batch may cause an overflow for collection at the top of the tower. Preferably the flow in the tower is downwards so that the inlet is at the top of the tower and the reaction product can be pumped or drained out at the base. Withdrawal is preferably simultaneous with supply but may be between supply of batches to the tower. If withdrawal is by overflow, then the automatic control of supply to the tower will inevitably give automatic control of withdrawal from the tower. However, if, as is more usual, withdrawal is by drainage or pumping then the operation of the necessary drainage valves and/or pump are preferably controlled automatically, generally in a similar manner to (and frequently simultaneously with) the control of the inlet supply.

Within the tower there should be intermittent plug flow in order to provide substantially quiescent conditions between supply and withdrawal times. There should be substantially no intermixing between batches. There should be a controlled residence time for each batch. It is important that there is substantially no stirring within the tower. The process thus differs from conventional processes in that most or all of the total reaction is performed in a simple tower having no static or mobile mixers.

In order to choose the most preferable dimensions of the reaction tower there are two factors to consider. Firstly, a greater cross sectional area will reduce temperature loss. For example, if the reaction time is short and the reaction conditions are similar to warm ambient temperatures, then insulation of the tower may be unnecessary, particularly if the reaction tower is large. Secondly, a smaller cross sectional area will minimise the interface between batches minimising mixing between the layers and providing greater control over the residence time of each batch in order to ensure that substantially the whole of each batch has remained in the reaction tower for substantially the intended residence time.

The polymeric material is preferably formed from water soluble ethylenically unsaturated monomer or monomer blend, and is preferably water soluble but may be lightly cross-linked and highly swellable, for example, as a reverse phase dispersion. Although the polymer within the tower should preferably be water soluble (or present as very small highly swollen lightly cross linked particles) it is not essential that the polymer should be in this final soluble form prior to entry to the tower although the aqueous mixture must be viscous (at least about 1000 cps) at the point of entry. In particular, the polymer in the aqueous mixture can be an oil-in-water emulsion of a polymer that is relatively insoluble at the pH of the emulsion but that can be solubilised to become very viscous upon adjustment of the pH. Thus a low viscosity emulsion can be mixed with a material for adjusting pH outside the tower to produce significant, but incomplete, increase in viscosity to a value generally well above 1000 cps, this viscous aqueous mixture is introduced into the tower, and further viscosification occurs within the tower. Often, however, it is more convenient for the viscosity within the tower to remain substantially constant.

The molecular weight is preferably at least 1 million, more preferably at least 5 million and most preferably at least 10 million and may even be up to 30 million or more. At these high molecular weights the preferred polymers give very viscous solutions at relatively low polymer concentrations. For instance the amount of polymer in the aqueous mixture is generally below 10% and usually below 5%. Normally it is above 0.5% and amounts of around 1 to 3% are typical.

Typical non-ionic monomers from which the polymers may be formed include acrylonitrile, styrene, alkyl esters of (meth) acrylic acid, and N-vinyl pyrollidone, but are generally acrylic monomers such as acrylamide. Typical anionic monomers are ethylenically unsaturated carboxylic andsulphonic monomers, such as (meth) acrylic acid, and 2-acrylamido-2-methyl propane sulphonic acid. Anionic monomers are usually present as sodium or other water soluble salts. Typical cationic monomers are diallyl dimethyl ammonium chloride, vinyl pyridine, and dialkylaminoalkyl (meth)-acrylates and - acrylamides, generally as acid addition or quaternary ammonium salts, such as methacrylamidopropyl trimethylammonium chloride, dimethylaminopropyl methacrylamide salts or quaternary salts of dimethylaminoethyl (meth) acrylate.

The final polymer can, depending upon the choice of monomers, be non-ionic, anionic or cationic. Particularly preferred polymers are polymers formed from 10 to 100% by weight, preferably 50 to 100% by weight and often substantially 100% by weight, acrylamide, with the other monomers being selected from anionic and cationic monomers.

The polymers can be provided as reverse phase dispersions, that is to say stable dispersions of small (typically below 10 $\mu$m) polymer particles in a water immiscible liquid. Such dispersions are made by reverse phase polymerisation, and this may be followed by azeotropic distillation to make the dispersions substantially dry.

Another liquid form of polymer that can be used in the invention is, as mentioned above, an oil-in-water emulsion made by oil-in-water emulsion polymerisation of a monomer blend that is insoluble at the pH of the polymerisation but which produces an emulsion polymer that can be solubilised or rendered highly swollen by adjustment of the pH.

Preferably however the polymer is supplied as a powder in which event it can have been made by bulk gel polymerisation followed by comminution and drying or it can have been made by reverse phase bead polymerisation followed by drying, and optionally, comminution, all in conventional manner.

Chemical reactions that can be performed in the invention include hydrolysis, methylolation, Mannich reactions, sulphomethylation, neutralisation and hydroxylamination.

A particularly preferred process is hydrolysis of acrylamide polymers, preferably substantial homopolymers, using sodium hydroxide or other base so as to form an anionic polyacrylamide. The hydrolysis can convert, typically, 5 to 50% of the acrylamide groups to sodium acrylate. The resultant anionic polyacrylamides are of particular value as viscosifiers, for instance enhanced oil recovery viscosifiers. Alternatively, the process can be conducted to higher degrees of hydrolysis.

Another type of hydrolysis reaction is hydrolysis of acrylonitrile groups to form acrylamide or acrylic acid groups. For instance polyacrylonitrile can be mixed with alkali outside the tower to form a viscous mixture that then undergoes further reaction and viscosification within the tower.

Acrylamide homopolymer or copolymer can be methylolated by reaction with a mixture of an aldehyde such as glyoxal or formaldehyde and base such as sodium hydroxide to make methylolated or glyoxalated polymer;

Mannich reaction of an acrylamide homopolymer or copolymer can be conducted with dimethylamine (or other amine) and formaldehyde or with dimethylaminopropylamine or a salt and formaldehyde. Another type of Mannich reaction can be between an acrylamide polymer and a low molecular weight Mannich product (for instance a Mannich product formed with urea) as described in EP-A-210784.

Acrylamide hompolymer or copolymer can be reacted with hydroxylamine under alkaline conditions to form a hydroxylamine derivative.

Sulphomethylated polyacrylamide (suitable for use in enhanced oil recovery) can be made by reaction of acrylamide homopolymer or copolymer with sodium bisulphite and formaldehyde under alkaline conditions.

The free acid form of anionic polymers can be contacted with alkali outside the tower to start neutralisation and to form a viscous mixture and then neutralisation and viscosification can be completed within the tower. For instance the initial polymer can be a homopolymer or copolymer of (meth) acrylic acid, maleic acid or maleic anhydride. It may be cross linked.

An oil-in-water emulsion polymer of anionic monomer (for instance methacrylic acid) with a water insoluble non-ionic monomer, such as ethyl acrylate, can be contacted with alkali outside the tower and solubilisation or swelling can be completed within the tower. Similarly, a cationic oil-in-water emulsion can be contacted with acid.

Suitable apparatus for carrying out the invention is illustrated schematically in the accompanying drawing.

Dry polymer particles from hopper 1 are carried by a screw feed 2 into a vessel 3 having a venturi outlet by which they are entrained in air from line 4 and fed along line 6 to a spray mixer 5.

In this vessel 5 the stream of polymer particles entrained in air contacts sprays of warm water supplied to the vessel by line 7 from a tank 8 provided with heaters to bring the water to the desired temperature. The moistened particles and the water are discharged into the mixing vessel 9 that is provided with a mixer 10. An aqueous solution of the reagent that is to be reacted with the polymer is fed into the vessel 9 via supply line 12 and the mixture is maintained in the vessel 9 for as long as it is required to achieve the desired degree of uniformity of composition, and viscosity.

The viscous mixture is then pumped from the base of the vessel 9 by a transfer pump 11 that can be, for instance, automatically controlled by a timer sequence, optionally through a heater 13 (if it is necesary to adjust the temperature of the mixture) and into the top of reaction tower 14 via supply line 15 as a batch of reaction mixture which is at substantially the optimum temperature for the reaction to proceed.

Reaction tower 14 has a size such that it is capable of holding more than one batch. When a further batch of reaction mixture has been mixed in vessel 9, this is also pumped into the reaction tower and applied on to the top of the previous batch, with substantially no intermixing. The frequency and size and number of batches pumped into the reaction tower determines the residence time of the reaction mixture in reaction tower 14 and when sufficient time has elapsed to produce sufficient conversion of the required product, the product is removed from the reaction tower via outlet 16 at the base of the tower, for instance using a time-controlled pump.

When the apparatus is to handle an emulsion or dispersion of polymer, instead of a powder, this emulsion or dispersion can be fed directly into the vessel 9, in conventional manner.

The reagent can be introduced through line 12 into any convenient position and at any time while the aqueous mixture has a sufficiently low viscosity. For instance it could be fed into the water in line 6 or in the tank 8.

The following are some examples.

EXAMPLE 1

This is an example of a Mannich reaction conducted using a urea Mannich as described in EP-A-210784. The apparatus is as shown in the drawing except that the heater 13 was omitted and a heater was provided in vessel 8.

44 Kg of high molecular weight polyacrylamide powder was charged into hopper 1. 1956 kg of water was charged to vessel 8 and heated to 35° C. 108 kg of a urea Mannich solution were charged to a holding tank attached to supply line 12. The water and polymer were then mixed in spray mixer 5 and passed into mixing vessel 9 where agitation was continued. When all of the polymer/water mixture had been added to vessel 9, the urea Mannich solution was added via supply line 12. The mixture was thoroughly agitated in vessel 9 for a further two hours to ensure the complete dissolution of the polyacrylamide and to ensure that a homogeneous mixture was produced. Its viscosity was about 12,000 cps (Brookfield RVT). The mixture was then transferred to the top of reaction tower 14, comprising a thermally insulated tank having volume 5 m$^3$.

This cycle was repeated until the reaction tower was filled with 5 batches of polymer solution and was then continued on a steady state basis. The polymer was allowed a minimum residence time of 24 hours before removal from the bottom of the tower. Throughout the procedure the make-up cycles of the mixture for feeding into the reaction tower 14 were timed to ensure the viscous mixture was given a minimum residence time in the reaction tower of 24 hours.

The final product was valuable as a flocculant for sewage, and typically was transported, in liquid form, to the place of use.

EXAMPLE 2

This example shows the hydrolysis of polyacrylamide and is conducted in apparatus that is the same as in example 1 except that the supply line 12 was not used. 44 kg of polyacrylamide powder was charged into hopper 1. 1883 kg water, 5.6 kg ethylene diamine tetra acetic acid, 60 kg sodium sulphate and 9 kg sodium hydroxide liquor were charged to vessel 8 and pre heated to 80° C. The aqueous alkali and polymer were mixed in the spray mixer 5 and fed into mixing vessel 9 where they were agitated for a further two hours before transfer to the reaction tower. Subsequent batches were produced at timed intervals to provide a minimum residence time of twelve hours on a steady state basis during prolonged operation of the process.

The resultant anionic polyacrylamide was suitable for use as a viscosifier in enhanced oil recovery and conveniently could be used on site for this purpose.

We claim:

1. In a process in which a polymer that can form a viscous aqueous solution is chemically modified by reaction with a reagent and that comprises forming an aqueous mixture of the reagent and the polymer, introducing the aqueous mixture into one end of a reaction tower, holding the mixture in the tower while the reaction proceeds and removing the mixture containing the chemically modified polymer from the other end of the tower, the improvement which comprises providing the polymer in the form of a powder, reverse phase dispersion or oil-in-water emulsion and the aqueous mixture is made by combining the water, the polymer and the reagent and has a viscosity (Brookfield RVT) of 1000 cps to 5000 cps at the point of introduction to the tower, the mixture is introduced as intermittent batches into the tower, the mixture moves through the tower with intermittent plug flow, and the mixture is removed from the tower as intermittent batches.

2. A process according to claim 1 in which the aqueous mixture is made by dissolving the polymer into water containing the reagent.

3. A process according to claim 1 in which the aqueous mixture has the desired reaction temperature before being introduced into the tower and is maintained at the desired reaction temperature in the tower without heating of the tower.

4. A process according to claim 3 in which the tower is insulated in order to minimise heat loss.

5. A process according to claim 1 in which the tower contains from 3 to 10 batches.

6. A process according to claim 1 in which the viscosity of the aqueous mixture at the point of introduction to the tower is at least 5000 cps.

7. A process according to claim 1 in which the polymer is selected from acrylamide polymers, polymers of ethylenically unsaturated acids in free acid form and acrylonitrile polymer.

8. A process according to claim 1 in which the polymer is a powder or reverse phase dispersion polymer.

9. A process according to claim 1 in which the reaction is selected from hydrolysis, methylolation, Mannich reaction, sulphomethylation, hydroxylamination and neutralisation.

10. A process according to claim 1, in which the polymer is an acrylamide polymer and the chemical modification is hydrolysis to form an anionic acrylamide or a Mannich reaction with amine and formaldehyde or Mannich product formed with urea to form a Mannich acrylamide polymer.

11. A process according to claim 1 in which the aqueous mixture is fed to the top of the tower and the chemically modified polymer is withdrawn from the base of the tower.

* * * * *